(12) United States Patent
Song et al.

(10) Patent No.: US 12,383,857 B2
(45) Date of Patent: Aug. 12, 2025

(54) APPARATUS AND METHOD FOR RAPID COOLING OF HIGH TEMPERATURE GAS

(71) Applicants: WANHUA CHEMICAL GROUP CO., LTD., Shandong (CN); WANHUA CHEMICAL (NINGBO) CO., LTD., Zhejiang (CN)

(72) Inventors: Mingyan Song, Shandong (CN); Yifeng Chen, Shandong (CN); Xiaofei Qiao, Shandong (CN); Changhao Ke, Shandong (CN); Jingkui Wang, Shandong (CN); Haibing Jia, Shandong (CN); Nan Zhao, Shandong (CN); Jinke Jiang, Shandong (CN); Peng Liu, Shandong (CN); Tianyong Yu, Shandong (CN); Yan Song, Shandong (CN); Zaigang Yang, Shandong (CN); Wuxi Luo, Shandong (CN); Changbao Xu, Shandong (CN); Junxian Liu, Shandong (CN); Jianmao Guo, Shandong (CN)

(73) Assignees: WANHUA CHEMICAL GROUP CO., LTD., Shandong (CN); WANHUA CHEMICAL (NINGBO) CO., LTD., Zhejiang (CN)

( * ) Notice: Subject to any disclaimer, the term of this patent is extended or adjusted under 35 U.S.C. 154(b) by 774 days.

(21) Appl. No.: 17/639,937

(22) PCT Filed: Aug. 26, 2020

(86) PCT No.: PCT/CN2020/111507
§ 371 (c)(1),
(2) Date: Mar. 3, 2022

(87) PCT Pub. No.: WO2021/068674
PCT Pub. Date: Apr. 15, 2021

(65) Prior Publication Data
US 2022/0323897 A1    Oct. 13, 2022

(30) Foreign Application Priority Data

Oct. 12, 2019 (CN) .......................... 201910967461.9

(51) Int. Cl.
*B01D 49/00* (2006.01)
*C01B 7/07* (2006.01)
(Continued)

(52) U.S. Cl.
CPC ............ *B01D 49/00* (2013.01); *C01B 7/0743* (2013.01); *F23J 15/06* (2013.01); *F28C 3/06* (2013.01);
(Continued)

(58) Field of Classification Search
CPC .................. B01D 49/00; C01B 7/0743; C01B 2210/0025; C01B 2210/0057;
(Continued)

(56) References Cited

U.S. PATENT DOCUMENTS 3,758,081 A     9/1973   Prudhon
4,642,127 A     2/1987   Ando et al.
(Continued)

FOREIGN PATENT DOCUMENTS

CN    1681864 A      10/2005
CN    101678620 A    3/2010
(Continued)

OTHER PUBLICATIONS

European Search Report issued on Oct. 4, 2023 in corresponding Patent Application No. 20873681.9-1002.
(Continued)

*Primary Examiner* — Eric S Ruppert
*Assistant Examiner* — Hans R Weiland
(74) *Attorney, Agent, or Firm* — NORTON ROSE FULBRIGHT US LLP

(57) ABSTRACT

The apparatus includes one or more cylindrical housings connected to one another, a jacket on an outer side of a
(Continued)

housing, an inner cylinder disposed at least in an interior of a first cylindrical housing, a heat insulation gasket, inner members, a corrosive high temperature gas inlet disposed on the heat insulation gasket, a gas and liquid phase outlet disposed at a bottom of the housing or a bottom of a last housing and a coolant inlet and outlet connected to an interior of the jacket. The heat insulation gasket seals the first cylindrical housing and a top of the inner cylinder in the interior of the first cylindrical housing. The inner members are distributed along a wall of the housing, communicate an interior of the jacket with an interior of the housing, and distribute a liquid in the interior of the jacket to the interior of the housing.

20 Claims, 5 Drawing Sheets

(51) Int. Cl.
    *F23J 15/06*     (2006.01)
    *F28C 3/06*     (2006.01)
(52) U.S. Cl.
    CPC ................ *C01B 2210/0025* (2013.01); *C01B 2210/0057* (2013.01); *C01B 2210/0062* (2013.01)
(58) Field of Classification Search
    CPC ................ C01B 2210/0062; F23J 15/06; F23J 2219/80; F28C 3/06; F28C 3/08
    See application file for complete search history.

(56) References Cited

U.S. PATENT DOCUMENTS

| | | | |
|---|---|---|---|
| 6,201,099 | B1 | 3/2001 | Petersen et al. |
| 2003/0220462 | A1 | 11/2003 | Porzio et al. |

FOREIGN PATENT DOCUMENTS

| | | | | |
|---|---|---|---|---|
| CN | 201470142 U | 5/2010 | | |
| CN | 101511728 B | 8/2011 | | |
| CN | 102964566 A | 3/2013 | | |
| CN | 106016324 A | 10/2016 | | |
| CN | 106164709 A | 11/2016 | | |
| CN | 106414538 A | 2/2017 | | |
| CN | 106588798 A | 4/2017 | | |
| CN | 206234834 U | 6/2017 | | |
| CN | 107057012 A | 8/2017 | | |
| CN | 107189034 A | 9/2017 | | |
| CN | 108003072 A | 5/2018 | | |
| CN | 108559058 A | 9/2018 | | |
| CN | 207990655 U | 10/2018 | | |
| CN | 208066017 U | 11/2018 | | |
| CN | 208269684 U | 12/2018 | | |
| CN | 109457205 A | 3/2019 | | |
| CN | 109761855 A | 5/2019 | | |
| CN | 209386313 U | 9/2019 | | |
| EP | 0 630 927 A2 | 12/1994 | | |
| GB | 2303693 A | * | 2/1997 | ............. B01D 47/06 |
| IN | 106164120 A | 11/2016 | | |
| JP | 59212685 A | * | 12/1984 | |
| JP | S59212685 A | 12/1984 | | |
| JP | 2002267147 A | 9/2002 | | |
| JP | 2014-234429 A | 12/2014 | | |
| JP | 2018-178000 A | 11/2018 | | |
| WO | WO-2010023306 A2 | * | 3/2010 | ............... B05B 7/06 |
| WO | 2017/022946 A1 | 2/2017 | | |

OTHER PUBLICATIONS

International Search Report issued in PCT/CN2020/111507 on Nov. 26, 2020.
First Office Action issued by the CIPO in the corresponding Patent Application No. 201910967461.9, with English translation.
First Search Report by the CIPO in the corresponding Patent Application No. 201910967461.9.

* cited by examiner

APPARATUS AND METHOD FOR RAPID COOLING OF HIGH TEMPERATURE GAS

CROSS-REFERENCE TO RELATED APPLICATIONS

The present application is a United States national phase under 35 U.S.C. § 371 of International Patent Application No. PCT/CN2020/111507 filed Aug. 26, 2020, which claims the benefit of priority from Chinese Patent Application No. 201910967461.9 filed Oct. 12, 2019, each of which is expressly incorporated herein by reference in its entirety.

TECHNICAL FIELD

The present disclosure relates to an apparatus and method for rapid cooling of a high temperature gas, which can be applied to a strongly corrosive solid-containing gas and belong to the application field of chemical plants and, in particular, to an apparatus and flow for rapid cooling, which can be widely applied to the field of treatment of HCl oxidation and pyrolysis gases and waste gases of incineration systems.

BACKGROUND

In an isocyanate process, chlorine balance is an important index affecting the cost of a product. At present, the most commonly used methods for treating HCl are: (1) direct absorption with alkali liquor, resulting in a waste of a large amount of chlorine resources; (2) producing products such as vinyl chloride, which earn low profits and are not competitive; (3) a Deacon catalytic oxidation method by which HCl is directly oxidized into chlorine so that chlorine is recycled. The method is introduced in CN101511728B. Through the analysis of processes and devices in this patent, a high temperature reaction gas contains HCl, $Cl_2$, $O_2$ and water, and heat exchangers made of a nickel material and a tantalum material are required to meet the requirement for cooling a corrosive high temperature gas from 400° C. to 150° C. Since a nickel-based material can withstand high temperature HCl and $Cl_2$ but cannot withstand the precipitation of water, acid-containing liquids corrode the nickel-based material severely. The tantalum material may withstand a hydrochloric acid solution with any concentration but cannot be used at a temperature of greater than 260° C. Moreover, catalyst particles in the reaction gas easily block a shell-and-tube heat exchanger so that an apparatus cannot operate stably.

In view of the above difficulties in the process, it is necessary to provide a new cooling method for a high temperature gas during HCl oxidation to replace the current conventional cooling method, reduce an investment in the apparatus, and improve the operation stability of the apparatus, so as to avoid the problems of a huge investment in the apparatus and the blockage of the heat exchanger in the current process.

When a hazardous waste containing halogen such as chlorine is incinerated, a flue gas out of an incinerator has a temperature of 1100° C., and harmful substances are basically decomposed. However, traces of harmful substances can be re-synthesized within a range of 200-500° C. Therefore, the flue gas needs to be rapidly cooled. CN206234834U has provided a quench tower for rapid cooling of a strongly corrosive high temperature flue gas. To extend the service life of the tower, a nozzle is used in the quench tower to form a water film on the inner wall of the tower to isolate the high temperature flue gas from the inner wall of the tower so that the tower is protected. This protection method cannot ensure the stability of the water film because the thickness of the water film is also affected by the velocity of the high temperature gas. Once a dry wall appears locally, irreversible damages are caused to the tower. If the dry wall cannot be found in time, serious safety accidents may be caused. In a conventional method of a lining of a heat-resistant mortar, the heat-resistant mortar cracks seriously under a process condition of continuous switching between a high temperature and a low temperature, which occurs in an interior of the apparatus and is difficult to find. CN208269684U has provided a device for rapid cooling of a high temperature flue gas. The device is made of graphite and has limited applications in many process occasions.

In view of the above difficulties in the process, it is necessary to provide a new method for rapid cooling of a high temperature flue gas to replace the current conventional cooling method, avoid the damages caused by the dry wall to the tower and the cracking of the heat-resistant mortar in the current process, ensure the safe operation of the apparatus, and avoid safety accidents.

SUMMARY

The present disclosure provides an apparatus and method for rapid cooling of a high temperature gas, which can be applied to a strongly corrosive solid-containing gas and include the apparatus for rapid cooling and a flow required for applying the apparatus for rapid cooling. The present disclosure can solve the problem of blockage of a heat exchanger, replace a filter and a cooler, and effectively reduce a risk of blockage when the solid-containing gas is cooled so that the corrosive gas can be cooled with higher safety and reliability and the apparatus can operate for a long period. Moreover, the present disclosure solves the problem of limited applications of special materials and can be widely applied to the field of treatment of HCl oxidation and pyrolysis gases and waste gases of incineration systems.

To achieve the preceding object, the present disclosure provides solutions described below.

An apparatus for rapid cooling of a high temperature gas, which can be applied to treatment of a strongly corrosive solid-containing gas, includes one or more cylindrical housings (that is, a first cylindrical housing to an n-th cylindrical housing, where n may be, for example, 1 to 6, preferably 2 to 3) connected to one another along an axial direction, a jacket on an outer side of each cylindrical housing, an inner cylinder disposed at least in an interior of the first cylindrical housing, a heat insulation gasket sealing the first cylindrical housing and a top of the inner cylinder in the interior of the first cylindrical housing, inner members distributed along a wall of the housing, communicating an interior of the jacket with an interior of the cylindrical housing, and configured to distribute a liquid in the interior of the jacket to the interior of the cylindrical housing, a high temperature gas inlet disposed on the heat insulation gasket, a gas and liquid phase outlet disposed at a bottom of the cylindrical housing or a bottom of a last cylindrical housing (in the case where multiple cylindrical housings are connected together) and a coolant inlet and outlet connected to the interior of the jacket.

In the present disclosure, the cylindrical housings connected to one another refer to that ends of adjacent cylindrical housings are butted together along the axial direction and are sorted from top to bottom into the first cylindrical housing to the n-th cylindrical housing. Of course, those skilled in the art may also understand that the cylindrical housings may be configured with the same inner diameter to ensure that a gas phase and a liquid phase flow relatively smoothly from top to bottom.

Further, the inner member is an opening penetrating through the wall of the cylindrical housing from the interior of the jacket, or the opening and a nozzle connected to the opening.

The preceding apparatus may comprises one or more sections which may be understood as being vertically connected, preferably 2 to 3 sections, where the cylindrical housing with the inner cylinder is a section a, and the cylindrical housing without the inner cylinder is a section b. The section a and the section b may be combined in the following manner: a combination of one section a and one section b (that is, a combination of sections a+b) from top to bottom, a combination of one section a and multiple sections b (that is, a combination of sections a+b+b+ . . . ) from top to bottom or cycling the combination of one section a and one section b (that is, a combination of sections a+b+a+b+a+b+ . . . ) from top to bottom, for example, 1 to 3 cycles.

Further, the inner member may be a water film generation member, a water mist generation member or a combination thereof. The water film generation member and the water mist generation member are distinguished according to functions and are both sprayer heads or openings. However, the water mist generation member has a higher requirement on a spray particle size and forms a water mist. The water film generation member is generally used in the section a with the inner cylinder, and the water mist generation member is mainly used in the section b without the inner cylinder. The section a is provided with the inner cylinder. A main function of the inner cylinder is to isolate the high temperature gas from the cylindrical housing to prevent hydrogen embrittlement or corrosion of the cylindrical housing due to a temperature higher than a tolerance temperature of a material. Moreover, the inner cylinder works together with the water film generation member to form a stable water film (where water sprayed from the opening or the sprayer head forms the water film under the action of the inner cylinder) as a second layer of protection of the cylindrical housing.

Both the section a and the section b include the cylindrical housing, the jacket on the outer side of the housing and the inner members disposed on the housing. A cooling medium is introduced into the jacket on the outer side of the cylindrical housing to cool a wall surface of the cylindrical housing so that the temperature of the wall surface of the cylindrical housing is close to that of the cooling medium and far lower than that of the high temperature gas, thereby protecting a device. The cooling medium is directly introduced into the inner members disposed on the cylindrical housing. As the second layer of protection of the cylindrical housing, the inner cylinder isolates the high temperature gas from the cylindrical housing. The water film formed by the inner members is directly applied to an outer wall of the inner cylinder. The inner cylinder works together with the water film generation member to form the stable water film to prevent the hydrogen embrittlement or corrosion of the cylindrical housing due to the temperature higher than the tolerance temperature of the material. Both the cylindrical housing and the inner cylinder have an open upper end and an open lower end.

In an embodiment, the cylindrical housing generally has a diameter (the diameter in the present disclosure, if not specifically stated, refers to an outer diameter) of 10 mm to 5000 mm, preferably 100 mm to 1000 mm, more preferably 250 mm to 600 mm, for example, 300, 400 or 500 mm; the cylindrical housing has a height of 0.4 m to 2.5 m, preferably 0.5 m to 1.5 m, for example, 0.8, 1.0 or 1.2 m. Preferably, for each section, if the inner cylinder exists, the inner cylinder in the section and the jacket each have the same height as the corresponding cylindrical housing. Of course, the height of the inner cylinder may also be slightly shorter than that of the housing, for example, 1 mm to 100 mm shorter. In an embodiment, a distance between the cylindrical housing and the jacket is 5 mm to 100 mm, preferably 10 mm to 30 mm, for example, 20, 50 or 80 mm. A distance between the cylindrical housing and the inner cylinder is 1 mm to 100 mm, preferably 5 mm to 50 mm, for example, 10, 20 or 40 mm. Generally, the cylindrical housing has a thickness of 1 mm to 100 mm, preferably 5 mm to 50 mm, for example, 10, 20 or 40 mm. Generally, the jacket on the outer side of the cylindrical housing has a thickness of 1 mm to 100 mm, preferably 5 mm to 50 mm, for example, 10, 20 or 40 mm. Generally, the inner cylinder has a thickness of 1 mm to 50 mm, preferably 2 mm to 10 mm, for example, 5, 8 or 25 mm. In an embodiment, if the cylindrical housing and the jacket are made of a lining material, the lining material generally has a thickness of 0.05 mm to 10 mm, preferably 2 mm to 5 mm, for example, 0.5, 1 or 8 mm. A gas entering the cylindrical housing has an initial velocity of 1 m/s to 100 m/s, preferably 5 m/s to 50 m/s, more preferably 15 m/s to 50 m/s, for example, 20 or 30 m/s; the gas stays for 0.01 s to 5 s, preferably 0.05 s to 1 s, more preferably 0.1 s to 0.5 s, for example, 0.2 or 0.3 s; generally, a flow rate of the gas may be 10 $Nm^3/h$ to 1000000 $Nm^3/h$, which may be adjusted according to a size of the device; and a ratio of volume flow rates of a coolant to the corrosive gas may be 1:10 to 5000, for example, 1:100, 1:1000 or 1:2000.

The preceding inner member includes the water film generation member disposed directly on the cylindrical housing. The water film generation member works together with the inner cylinder to form the water film (covering the outer wall of the inner cylinder in the section a and/or an inner wall of the cylindrical housing in the section b) in the interior of the cylindrical housing to prevent the housing from being in direct contact with the high temperature gas so that the service life of the device is extended. The water film generation member may be a round or elongated opening connected to no nozzle, the opening connected to the nozzle or a combination of the nozzle connected to the opening and the opening connected to no nozzle. Those skilled in the art may understand that a width of a gap between the housing and the inner cylinder and a water flow rate may be adjusted to ensure the formation of the water film.

The preceding inner member may further include the water mist generation member which may be directly disposed on the cylindrical housing or may extend to the interior of the cylindrical housing by being connected to a pipe. The water mist generation member may form a mist screen in the interior of the cylindrical housing, where the mist screen is rapidly mixed with the high temperature gas so that the high temperature gas is rapidly cooled. The water mist generation member may be the round or elongated opening connected to no nozzle, the opening connected to the nozzle or a combination of the nozzle connected to the opening and the opening connected to no nozzle, for example, the opening connected to no nozzle accounts for 10% to 90% of total openings, for example, 20%, 50% or 80%.

The water film generation member and the water mist generation member are distinguished according to the functions. However, the water mist generation member has the higher requirement on the spray particle size. The water film generation member is generally used in the section a with the inner cylinder, and the water mist generation member is mainly used in the section b without the inner cylinder.

For the nozzle used by the water film generation member and the water mist generation member of the apparatus for rapid cooling of the high temperature gas, a single nozzle is required to have a flow rate of 10 L/min to 1000 L/min, preferably 30 L/min to 100 L/min. The spray particle size is required to be ≤2000 preferably ≤1000 more preferably ≤500 for example, 10, 50 or 100 μm. A pressure drop is required to be controlled within a range of ≤5 bar, preferably ≤1.5 bar, more preferably ≤0.5 bar. The single nozzle may spray at an angle of 60° to 120°, for example, 90°, more preferably 120°. The nozzles may be uniformly distributed on the cylindrical housing or mounted in a center of the interior of the housing. The nozzle is mounted on the cylindrical housing in a direction which is at 30° to 150° with a direction of a horizontal tangent of a mounting point on the wall of the cylindrical housing, for example, 90°, more preferably 60° to 120° with the direction of the horizontal tangent of the mounting point on the wall of the cylindrical housing, for example, 90°, and at 30° to 150° with an axial direction of the wall of the cylindrical housing, for example, 90°, more preferably 60° to 120° with the axial direction of the wall of the cylindrical housing. The nozzles are required to uniformly cover an entire cross-section of a pipe. The number of nozzles on each cross-section is 1 to 50, preferably 2 to 10. A single layer or multiple layers of nozzles may be disposed, where the number of layers is determined according to a height of the apparatus for rapid cooling, and a distance between layers is required to be 10 mm to 1000 mm, preferably 200 mm to 500 mm. The nozzle is not limited to various types of nozzle and may be a spiral nozzle, a wide-angle nozzle or a right-angle nozzle.

The round or elongated opening used by the water film generation member and the water mist generation member of the apparatus for rapid cooling of the high temperature gas has an open area ratio greater than or equal to 0.05% and an equivalent diameter greater than or equal to 0.5 mm, preferably 1 mm to 5 mm. The openings may be uniformly distributed or concentrated to achieve the uniform distribution of the water film or the water mist. The distribution of the openings may be calculated through an amount of water and simulation, and the number of openings only needs to ensure that the water film or the water mist can be uniformly distributed. Generally, a transverse distance between adjacent openings is 5 mm to 100 mm, preferably 20 mm to 50 mm; and an axial distance between adjacent openings is 10 mm to 1000 mm, preferably 50 mm to 500 mm. The number of openings may be determined by the diameter and the height of the housing based on the requirement that it is ensured that the water film is uniformly distributed or the water mist is fully mixed with the high temperature gas in the interior of the cylindrical housing. The coolant ejected from the round or elongated opening has a linear velocity of 0.5 m/s to 50 m/s, preferably 2 m/s to 10 m/s. A pressure drop is required to be controlled within a range less than or equal to 5.0 bar, preferably less than or equal to 1.0 bar, more preferably less than or equal to 0.5 bar.

The cooling medium is introduced into the jacket on the outer side of the cylindrical housing of the apparatus for rapid cooling of the high temperature gas to cool the wall surface of the cylindrical housing so that the temperature of the wall surface of the cylindrical housing is close to that of the cooling medium and far lower than that of the high temperature gas, thereby protecting the device. The cooling medium in the interior of the jacket is also a liquid source of the water film generation member and the water mist generation member. On the one hand, the inner cylinder of the preceding apparatus for rapid cooling introduces the gas having the temperature higher than the tolerance temperature of the material; on the other hand, the inner cylinder isolates the high temperature gas from the cylindrical housing to prevent hydrogen embrittlement or corrosion of the cylindrical housing due to the temperature higher than the tolerance temperature of the material and works together with the water film generation member to form the stable water film. The water film can lower the temperatures of the wall of the cylindrical housing and the wall of the inner cylinder and act on the cylindrical housing in a second section to lower the temperature of the wall of the cylindrical housing in the second section. The inner cylinder serves as the second layer of protection of the cylindrical housing. A lower portion of the inner cylinder communicates directly with the cylindrical housing in the second section, the pipe or the device.

The apparatus for rapid cooling of the high temperature gas may be used in a rapid cooling process of the solid-containing gas. A solid content in the gas may be 0% to 10%, preferably 0% to 1%, more preferably 0% to 0.5%. In an embodiment, the solid content may be 0.2%, 0.5% or 0.8% (the content, if not specifically stated in the present disclosure, is a mass content). A particle size of the solid may be 0.1 μm to 5000 μm, preferably 0.1 μm to 1000 μm, more preferably 0.1 μm to 500 μm, for example, 100 μm or 200 μm. Moreover, the apparatus may also be used in a rapid cooling process of the corrosive gas. The corrosive gas or the strongly corrosive gas may be phosgene, hydrogen chloride, chlorine, hydrogen bromide, hydrogen sulfide, sulfur dioxide, boron trifluoride, boron trichloride and ammonia. The gas entering the apparatus for rapid cooling may have a temperature between 40° C. to 1500° C., for example, 200, 500, 800, 1000, 1100 or 1200° C. In the apparatus for rapid cooling of the high temperature gas, a material for manufacturing the cylindrical housing, the inner cylinder and the jacket (including the inner member such as the nozzle) has a thermal conductivity greater than or equal to 5 W/m*K, preferably greater than or equal to 50 W/m*K, more preferably greater than or equal to 100 W/m*K, and the material may be carbon steel (CS), 316L, a nickel-based material and a tantalum material, and other materials such as enamel and CS/polytetrafluoroethylene are not recommended. The temperature of the wall is required to be controlled within a tolerance range of the material, preferably 40° C. to 150° C. The cooling medium in the interior of the jacket on the outer side of the housing may be one of a hot oil, a steam condensate, a molten salt, washing water, cooling water, chilled water, process water and a neutralization liquid. The neutralization liquid may be a KOH or NaOH solution, preferably a material in a system. Of course, the present disclosure may also be used for treating a non-corrosive gas, and the material may be stainless steel, for example, 304 stainless steel.

The present disclosure further provides a system for rapid cooling of a high temperature gas and including the preceding apparatus. The system further includes a gas-and-liquid separation device, a liquid delivery device and a heat transfer device.

An outlet of the apparatus for rapid cooling of the high temperature gas is connected to an inlet of the gas-and-liquid separation device through a pipe. The gas-and-liquid separation device has a gas outlet and a liquid outlet, where a liquid separated by the gas-and-liquid separation device is delivered to the heat transfer device (a heat exchanger) through the liquid delivery device (such as a pump) and returned to an inlet of a jacket of the apparatus for rapid cooling of the high temperature gas after being delivered out of the heat transfer device.

Further, a lower portion or a bottom of the gas-and-liquid separation device is provided with a pipe for irregularly discharging drainage.

The present disclosure further provides a method for rapid cooling of a high temperature gas using the preceding apparatus. The method includes steps described below. A strongly corrosive solid-containing high temperature gas enters the apparatus for rapid cooling of the high temperature gas and is rapidly cooled in an interior of a first cylindrical housing by a liquid (coolant) entering the apparatus. Optionally, the gas is further rapidly mixed with the liquid entering the apparatus and cooled in an interior of a cylindrical housing at a next stage. A gas and liquid phase enters a gas-and-liquid separation device (the device may be a storage tank or a tower). The cooled gas phase leaves the device, part of the liquid phase is extracted, and part of the liquid phase is cooled and returned to the apparatus for rapid cooling of the high temperature gas to be recycled. A ratio of volume flow rates of the coolant to the corrosive gas may be 1:10 to 5000, and flow rates of the coolant and the corrosive gas are as described above.

The present disclosure has beneficial effects described below.

The method can prevent the blockage of the heat exchanger, replace the filter and the cooler, and effectively reduce the risk of blockage when the solid-containing gas is cooled so that the corrosive gas can be cooled with higher safety and reliability and the apparatus can operate for a long period. Moreover, the method can solve the problem of the limited applications of the special materials so that the special materials can be applied at a temperature above a temperature limit. The method is particularly suitable for rapid cooling of the solid-containing gas, the corrosive gas or the strongly corrosive gas.

BRIEF DESCRIPTION OF THE DRAWINGS

FIG. 1(a) shows a section a with an inner cylinder, and FIG. 1(b) shows a section b without the inner cylinder.

Figure 1:
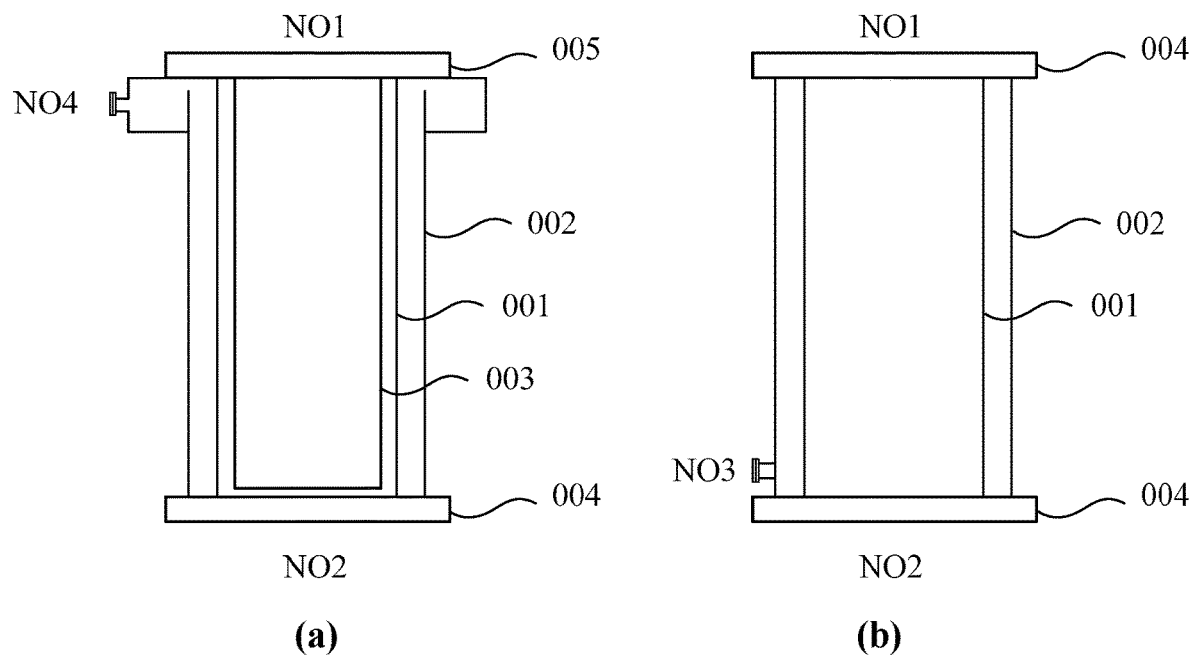
FIG. 1 is a structure diagram of an apparatus for rapid cooling of a high temperature gas, where

REFERENCE LIST 001 cylindrical housing
002 jacket on an outer side of the housing
003 inner cylinder
004 segmenting flange
005 heat insulation gasket
006 inner member
N01 corrosive high temperature gas inlet
N02 gas and liquid phase outlet
N03-N05 coolant inlet and outlet
101 apparatus for rapid cooling
102 gas-and-liquid separation device
103 liquid delivery device
104 heat transfer device
201-207 connection pipe It is to be noted that both the section a and the section b in FIG. 1 consist of the cylindrical housing, the jacket on the outer side of the housing, a water film generation member and a water mist generation member, the section a has the inner cylinder, and the section b does not have the inner cylinder. The section a and the section b may be combined in the following manner: a combination of sections a+b, a combination of sections a+b+b+ . . . or a combination of sections a+b+a+b+a+b+ . . . .

Figure 4:
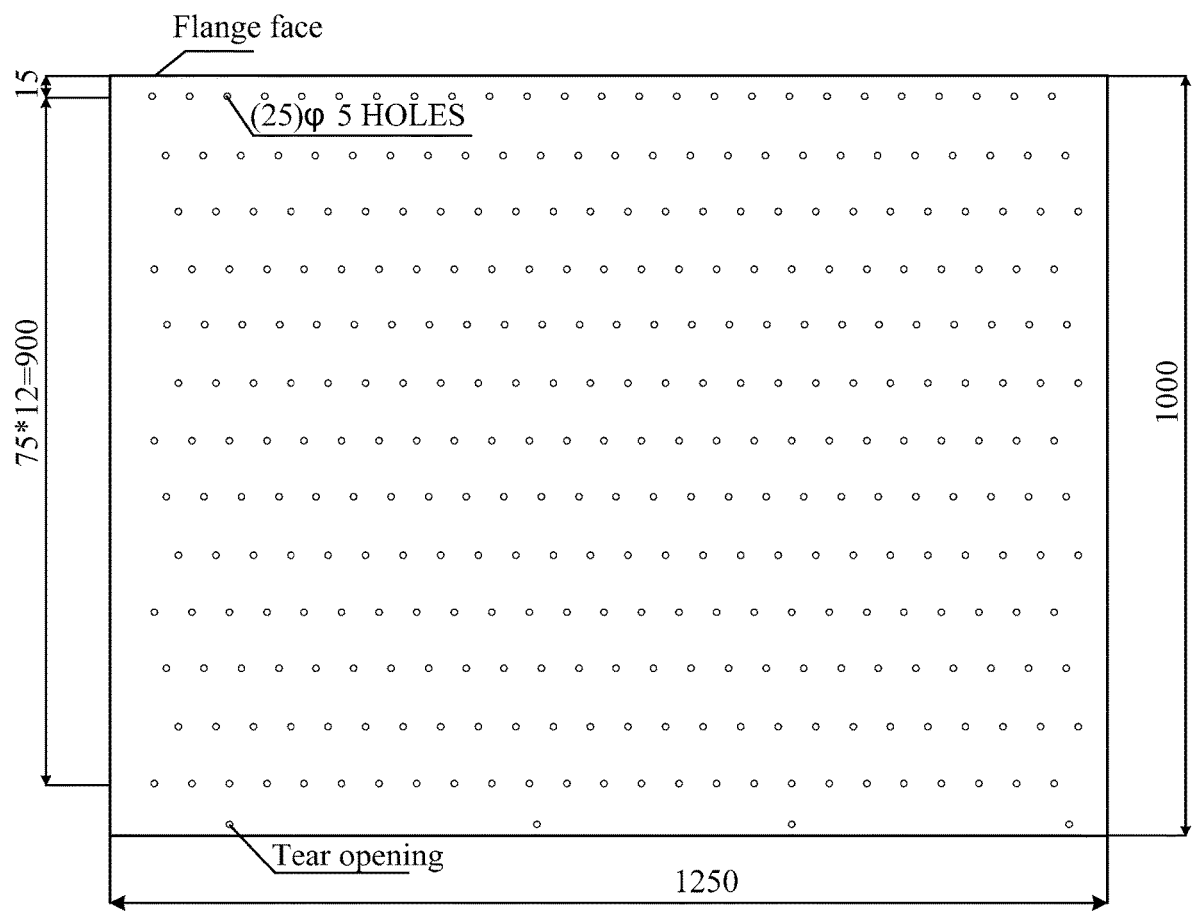
FIG. 4 is a structure diagram of an unfolded housing provided with inner members.
Figure 5:
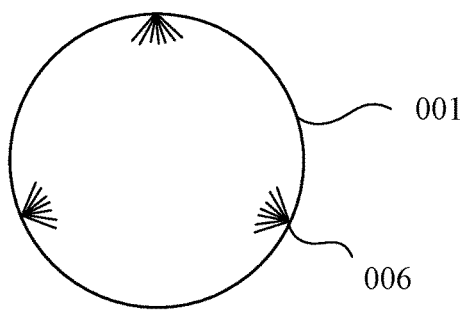
FIG. 5 is a structure diagram of inner members disposed on a housing.
Figure 6:
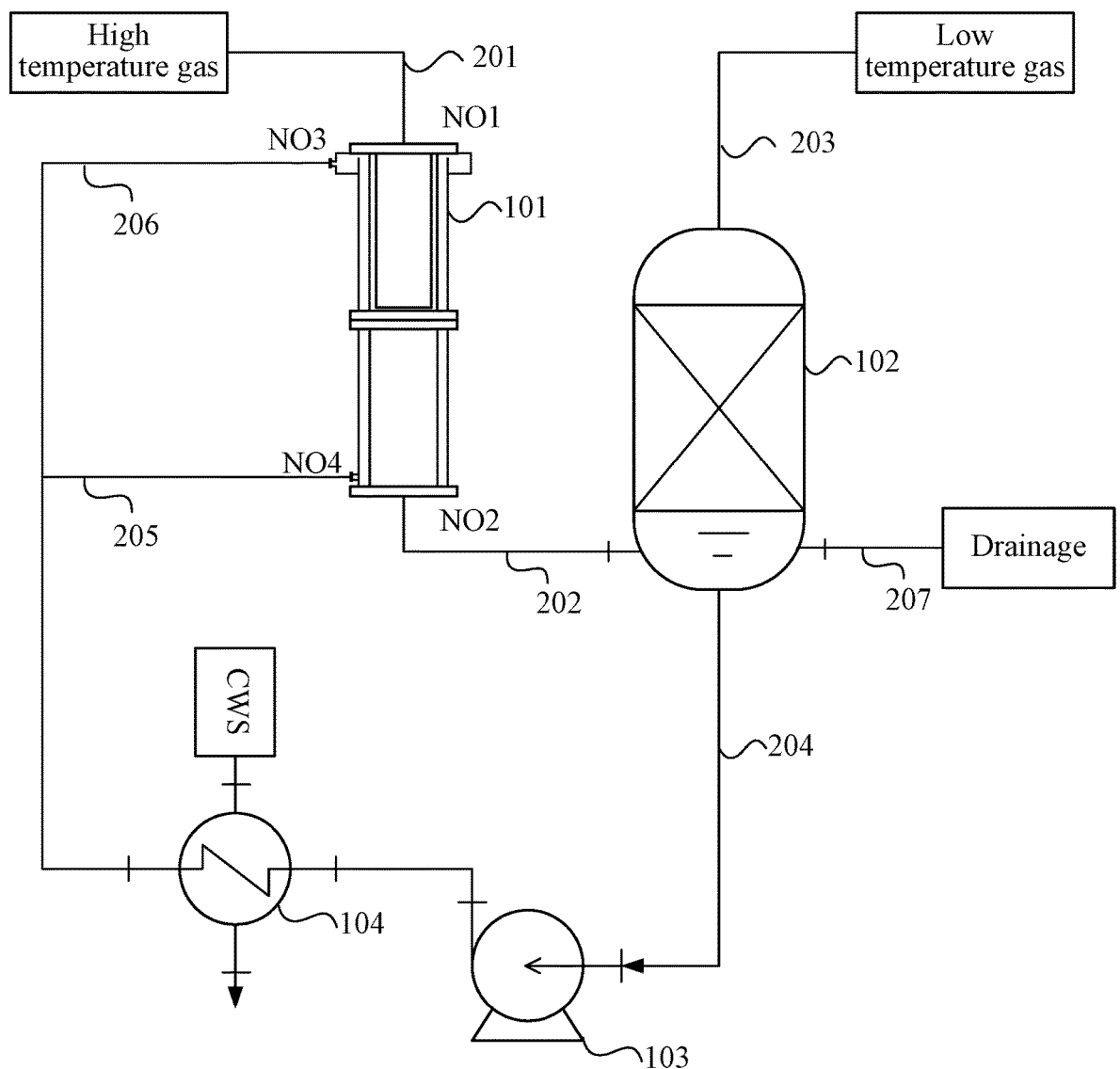
FIG. 6 is a flowchart for rapid cooling of a high temperature gas.

It is to be noted that FIGS. 4 and 5 only illustrate one type of water film generation member, one type of water mist generation member and distributions thereof. It is specified in the present disclosure that the water film generation member and water mist generation member are not limited to these two types. Any apparatus for rapid cooling capable of forming a stable water film and a water mist through sprayer heads and openings is within the scope of the present disclosure.

DETAILED DESCRIPTION

The present disclosure is further described below in conjunction with embodiments, but the present disclosure is not limited to the following embodiments. In the following embodiments, a diameter, if not specifically stated, refers to an outer diameter.

EXAMPLE 1

Figure 2:
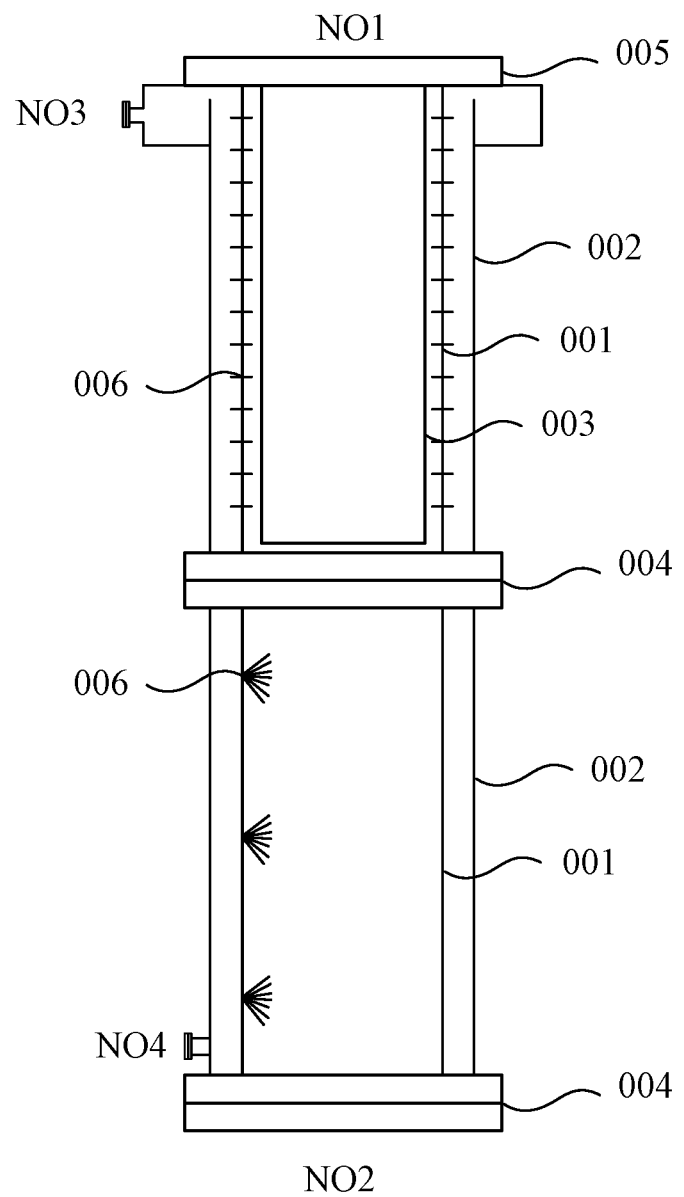
FIG. 2 is a structure diagram of an apparatus for rapid cooling of a high temperature gas, including one section a and one section b.

An apparatus for rapid cooling shown in FIG. 2 is used, which consists of one section a and one section b. The apparatus for rapid cooling includes a cylindrical housing with a diameter of 400 mm and is divided into two sections. A first section (section a) has a height of 1.0 m, and a second section (section b) has a height of 1.0 m. A distance between the cylindrical housing and a jacket in each section is 30 mm. The first section has an inner cylinder, and the second section does not have the inner cylinder. A distance between the cylindrical housing and the inner cylinder in the first section is 5 mm. In the apparatus for rapid cooling, the cylindrical housing is made of a tantalum material, a body of the jacket on an outer side of the housing is made of CS, tantalum covers an inner side of the jacket, the inner cylinder and a sprayer head are made of the tantalum material, the cylindrical housing has a thickness of 4 mm, the jacket on the outer side of the housing has a thickness of 20 mm, the inner cylinder has a thickness of 3 mm, and a lining material on the inner side of the jacket has a thickness of 1.2 mm.

An opening (communicating with an interior of the jacket and passing through a wall of the cylindrical housing) for the cylindrical housing in the first section is a round opening shown in FIG. 4, which has an open area ratio of 0.5% and a diameter of 5 mm. 13 layers of openings, 25 openings in each layer, are uniformly distributed on the cylindrical housing. The round opening has a linear velocity of 1.74 m/s, a pressure drop is 80 kPa, and a liquid entering the jacket has a flow rate of 40 m$^3$/h and a temperature of 98° C. An inner member for the cylindrical housing in the second section is a nozzle. The nozzle communicates with the interior of the jacket through the opening which passes through the wall of the cylindrical housing and is configured to spray the liquid in the interior of the jacket to an interior of the cylindrical housing. The nozzle is a wide-angle nozzle. A single nozzle sprays at an angle of 120° and has a spray particle size of 500 um, a pressure drop is 1.0 bar, and the liquid entering the jacket has a flow rate of 40 m³/h and a temperature of 98° C. Mounting positions of nozzles are uniformly distributed on the cylindrical housing. The nozzle is mounted on the cylindrical housing in a direction which is at 90° with an axial direction of the wall of the cylindrical housing and 90° with a direction of a horizontal tangent of a mounting point on the wall of the cylindrical housing. The number of nozzles on each cross-section is 3, and the number of layers is 3. Nozzles in a second layer rotate 60° clockwise according to an arrangement of nozzles in a first layer, and nozzles in a third layer rotate 60° clockwise according to an arrangement of the nozzles in the second layer, ensuring that a high temperature gas completely passes through the three layers of nozzles. The first section is an introduction section provided with the inner cylinder to prevent the high temperature gas from being in direct contact with the cylindrical housing. Moreover, a water film is formed between the inner cylinder and the cylindrical housing so that an inner wall of the housing in the second section is protected to prevent the high temperature gas from being in contact with the inner wall of the housing.

The high temperature gas (a gas from an HCl oxidation reactor) entering the apparatus for rapid cooling has a pressure of 0.42 MPaG, a temperature of 380° C., a flow rate of 4000 Nm³/h and a volume composition of HCl (15%), Cl₂ (30%), H₂O (27%), O₂ (18%) and CO₂ (10%) and contains 0.5% (by weight) of solid particles with an average particle size of 200 μm. The high temperature gas enters an apparatus for rapid cooling 101 through a pipe 201 and an inlet N01. The first section of the apparatus for rapid cooling 101 is the introduction section of an acid high temperature gas. A dilute acid (a hydrochloric acid with a mass concentration of 21%), which has a flow rate of 40 m³/h and a temperature of 98° C., enters a jacket 002 through a pipe 206 and an inlet N03. The jacket 002 is filled with the dilute acid for cooling a cylindrical housing 001. The dilute acid is sprayed directly onto an outer wall of the inner cylinder through the round openings on the cylindrical housing to form the water film, which protects the inner side of the cylindrical housing in the first section and the inner side of the cylindrical housing in the second section. The corrosive high temperature gas enters the second section of the apparatus for rapid cooling 101. The dilute acid (21%) having a flow rate of 40 m³/h and a temperature of 98° C. enters the jacket 002 through a pipe 205 and an inlet N04. A water mist generation member, the nozzle, is directly mounted on the cylindrical housing. The dilute acid enters the nozzle through the jacket. The dilute acid is atomized by the nozzle and fully mixed with the acid high temperature gas to rapidly cool the acid high temperature gas to about 120° C. The mixed gas phase and liquid phase leave the apparatus for rapid cooling 101 through an outlet N02 and enter a device 102 for gas-and-liquid separation through a pipe 202. A low temperature gas enters a subsequent device through a pipe 203. The liquid phase enters a device 103 through a pipe 204, enters a heat exchanger 104 to be cooled to 98° C., and enters the jacket of the apparatus for rapid cooling through the pipe 205 and the pipe 206 to enter the interior of the housing of the apparatus for rapid cooling.

The apparatus for rapid cooling has operated continuously for three months, and the tantalum material is free of hydrogen embrittlement at a high temperature of 380° C. Moreover, a nickel-based heat exchanger and a tantalum heat exchanger in an original process are replaced, simplifying a flow and operations.

Example 1-1

Differences from Example 1 are listed below. The apparatus for rapid cooling includes the cylindrical housing with a diameter of 100 mm and is divided into two sections. The first section (section a) has a height of 1.5 m, and the second section (section b) has a height of 2.5 m. The distance between the cylindrical housing and the jacket in each section is 10 mm. The first section has the inner cylinder, and the second section does not have the inner cylinder. The distance between the cylindrical housing and the inner cylinder in the first section is 25 mm.

The opening (communicating with the interior of the jacket and passing through the wall of the cylindrical housing) for the cylindrical housing in the first section is the round opening shown in FIG. 4, which has an open area ratio of 5% and a diameter of 1 mm. 150 layers of openings, 205 openings in each layer, are uniformly distributed on the cylindrical housing. The round opening has a linear velocity of 8.5 m/s, the pressure drop is 3.0 bar, and the liquid entering the jacket has a flow rate of 120 m³/h and a temperature of 98° C. The inner member for the cylindrical housing in the second section is the nozzle. The nozzle communicates with the interior of the jacket through the opening which passes through the wall of the cylindrical housing and is configured to spray the liquid in the interior of the jacket to the interior of the cylindrical housing. The nozzle is a wide-angle nozzle. A single nozzle sprays at an angle of 120° and has a spray particle size of 2000 μm, the pressure drop is 0.5 bar, and the liquid entering the jacket has a flow rate of 8 m³/h and a temperature of 98° C.

The apparatus for rapid cooling has operated continuously for three months, and the tantalum material is free of hydrogen embrittlement at a high temperature of 380° C.

EXAMPLE 2

Figure 3:
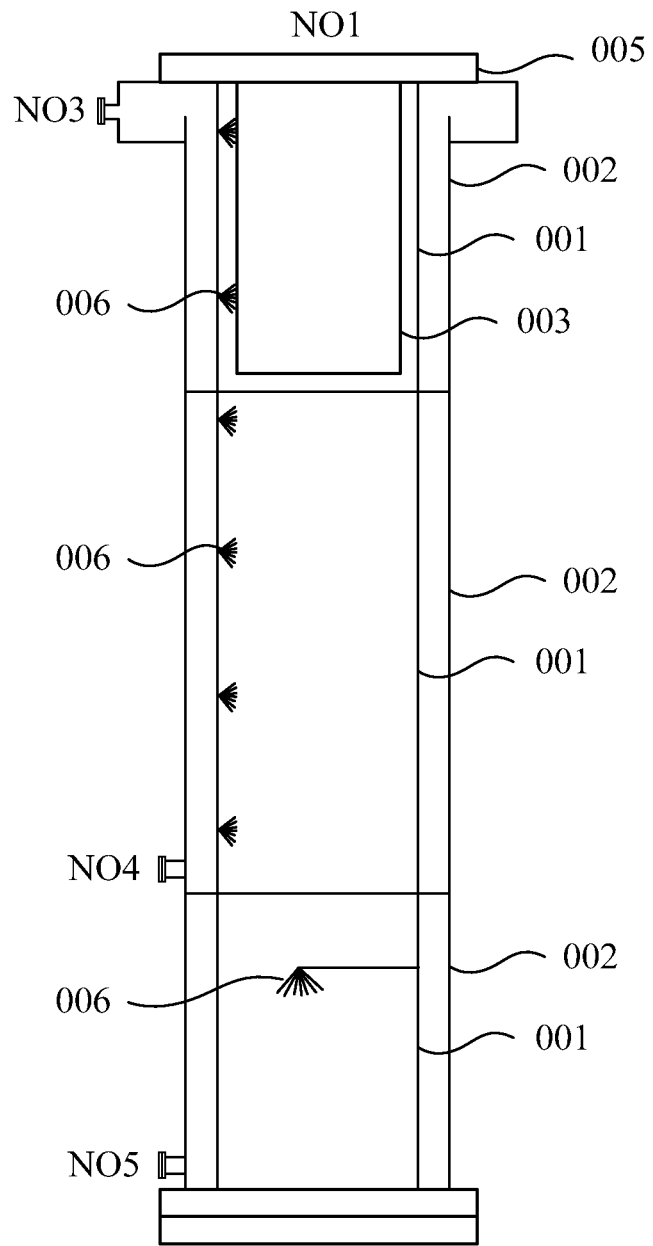
FIG. 3 is a structure diagram of an apparatus for rapid cooling of a high temperature gas.

An apparatus for rapid cooling shown in FIG. 3 is used, which consists of sections a+b+b. The apparatus for rapid cooling includes a cylindrical housing with a diameter of 2000 mm and is divided into three sections. A first section has a height of 0.5 m, a second section has a height of 1 m, and a third section has a height of 0.5 m. The three sections are connected through welding. A distance between the cylindrical housing and a jacket in each section is 50 mm. The first section has an inner cylinder, and the second section and the third section do not have the inner cylinder. A distance between the cylindrical housing and the inner cylinder is 5 mm. In the apparatus for rapid cooling, the cylindrical housing, a sprayer head and the inner cylinder are made of 304 stainless steel, 304 stainless steel covers an inner side of the jacket on an outer side of the housing, the cylindrical housing has a thickness of 5 mm, the jacket on the outer side of the housing has a thickness of 15 mm, and the inner cylinder has a thickness of 1.5 mm.

An inner member for the cylindrical housing in the first section is a nozzle. The nozzle communicates with an interior of the jacket through an opening (which has a diameter similar to that of the nozzle) which passes through a wall of the cylindrical housing and is configured to spray a liquid in the interior of the jacket to an outer wall of the inner cylinder. The nozzle is a wide-angle nozzle. A single nozzle sprays at an angle of 120° and has a spray particle size of 800 and a pressure drop is 1.5 bar. Mounting positions of nozzles are uniformly distributed on the cylindrical housing. The nozzle is mounted on the cylindrical housing in a direction which is at 90° with an axial direction of the wall of the cylindrical housing and 90° with a direction of a horizontal tangent of a mounting point on the wall of the cylindrical housing. The number of nozzles on each cross-section is 10, and the number of layers is 2. An inner member for the cylindrical housing in the second section is the nozzle. The nozzle communicates with the interior of the jacket through the opening which passes through the wall of the cylindrical housing and is configured to spray the liquid in the interior of the jacket to an interior of the cylindrical housing. The nozzle is a spiral nozzle. A single nozzle sprays at an angle of 120° and has a spray particle size of 800 and a pressure drop is 1.5 bar. Mounting positions of nozzles are uniformly distributed on the cylindrical housing. The nozzle is mounted on the cylindrical housing in a direction which is at 90° with a direction of a horizontal tangent of a mounting point on the wall of the cylindrical housing and 120° with an axial direction of the wall of the cylindrical housing. The number of nozzles on each cross-section is 10, and the number of layers is 4. An inner member for the cylindrical housing in the third section is the wide-angle nozzle. A single nozzle sprays at an angle of 120° and has a spray particle size of 800 μm and a pressure drop is 1.5 bar. The number of nozzles on each cross-section is 1, and the number of layers is 4. The nozzles are uniformly distributed in a center of the cylindrical housing. The first section is an introduction section, the second section is a cooling section, and the third section is a protection section to prevent a relatively high temperature in the center.

A high temperature gas (a pyrolysis gas from a cracking furnace) entering the apparatus for rapid cooling has a pressure of 0.005 MPaG, a temperature of 490° C., a flow rate of 500000 Nm$^3$/h and a composition of water, ethylene, ethane, propane, propylene and butadiene. The high temperature gas enters an apparatus for rapid cooling 101 through a pipe 201. The first section of the apparatus for rapid cooling 101 is the introduction section. A quench oil (a C11 to C20 hydrocarbon oil), which has a flow rate of 800 m$^3$/h and a temperature of 150° C., enters a jacket 002 through a pipe 206 and an inlet N03. The jacket 002 is filled with the quench oil for cooling a cylindrical housing 001. The quench oil is sprayed directly onto the inner cylinder through the sprayer head on the cylindrical housing to form a cooling oil film, where the oil film protects the inner side of the cylindrical housing in the first section and the inner side of the cylindrical housing in the second section. The second section is the cooling section. The quench oil having a temperature of 150° C. and a flow rate of 1750 m$^3$/h passes through a pipe 205 the jacket of the apparatus for rapid cooling and the nozzle on the cylindrical housing. The quench oil is atomized and mixed with the high temperature gas to rapidly cool the high temperature gas to 240° C. The high temperature gas enters the third section of the apparatus for rapid cooling 101. The quench oil having a temperature of 150° C. and a flow rate of 240 m$^3$/h passes through the pipe 205 and enters the nozzle through the jacket. The quench oil is atomized and fully mixed with a center of the high temperature gas to ensure a cooling effect of the center of the high temperature gas. The cooled gas enters a device 102 for gas-and-liquid separation through a pipe 202. A low temperature gas enters a subsequent device through a pipe 203. A liquid phase enters a device 103 through a pipe 204, enters a heat exchanger 104 to be cooled to 150° C. and enters the jacket of the apparatus for rapid cooling through the pipe 205 and the pipe 206 to enter the interior of the housing of the apparatus for rapid cooling. The heat exchanger may produce low-pressure steam for energy recovery.

The apparatus for rapid cooling replaces a quench tower in a current process of cooling the pyrolysis gas, simplifies a flow, reduces an investment in the device and ensures the cooling effect. The apparatus operates stably for a long period.

Example 2-1

Differences from Example 2 are listed below. The cylindrical housing of the apparatus for rapid cooling has a diameter of 5000 mm. The distance between the cylindrical housing and the jacket in each section is 100 mm, and the distance between the cylindrical housing and the inner cylinder in the first section is 50 mm. The high temperature gas entering the apparatus for rapid cooling has a pressure of 0.005 MPaG, a temperature of 490° C. and a flow rate of 55000 Nm$^3$/h. The quench oil in the first section has a flow rate of 500 m$^3$/hr, the quench oil in the second section has a flow rate of 1500 m$^3$/hr, and the quench oil in the third section has a flow rate of 50 m$^3$/hr. The apparatus for rapid cooling replaces the quench tower in the current process of cooling the pyrolysis gas, simplifies the flow, reduces the investment in the device and ensures the cooling effect. The apparatus operates stably for a long period.

COMPARATIVE EXAMPLE 1

A high temperature gas, which has a pressure of 0.42 MPaG, a temperature of 380° C., a flow rate of 4000 Nm$^3$/h and a composition of HCl, $Cl_2$, $H_2O$ and $O_2$ and contains 0.5% of solid particles with an average particle size of 200 um, is cooled to 180° C. in a nickel-based shell-and-tube heat exchanger, is cooled to 120° C. in a tantalum shell-and-tube heat exchanger, and then enters a gas-and-liquid separation device. Catalyst particles in the reaction gas easily cause blockage of the shell-and-tube heat exchanger so that an apparatus cannot operate stably. If the nickel-based heat exchanger is in a supercooled state, a liquid appears, causing corrosion of the nickel-based heat exchanger. After operating for one month, the nickel-based heat exchanger is seriously blocked by solids and cannot reach a cooling design value, and the tantalum heat exchanger cannot operate at a temperature of 200° C. so that the device has a risk of hydrogen embrittlement and the apparatus is forced to shut down.

COMPARATIVE EXAMPLE 2

A high temperature gas, which has a pressure of 0.005 MPaG, a temperature of 490° C., a flow rate of 500000 Nm$^3$/h and a composition of water, ethylene, ethane, propane, propylene and butadiene, passes through a section b of an apparatus for rapid cooling without a jacket. A cylindrical housing has a thickness of 5 mm and a length of 2.0 m. An inner member on the cylindrical housing is a nozzle. The nozzle is a spiral nozzle. A single nozzle sprays at an angle of 120° and has a spray particle size of 800 um, and a pressure drop is 1.5 bar. Mounting positions of nozzles are uniformly distributed on the cylindrical housing. The nozzle is mounted on the cylindrical housing in a direction which is at 90° with an axial direction of the wall of the cylindrical housing and 90° with a direction of a horizontal tangent of a mounting point on the wall of the cylindrical housing. The number of nozzles on each cross-section is 10, and the number of layers is 4. A quench oil having a temperature of 150° C. and a flow rate of 1750 m$^3$/h passes through a pipe and the nozzle on the cylindrical housing. The quench oil is atomized and mixed with the high temperature gas to cool the high temperature gas to 240° C. Under these process conditions, without being cooled by the quench oil in the jacket, a wall surface of the cylindrical housing has a relatively high temperature. Moreover, without an inner member for formation of a water film, the cylindrical housing cannot be protected by the water film so that the uniformity of the temperature of the wall surface of the cylindrical housing cannot be ensured, and local hot spots are easy to form, causing damages to the device and shortening a service life of the device. After half a year of operation, the apparatus has relatively many high temperature corrosion spots and is forced to shut down for maintenance.

What is claimed is:

1. An apparatus for rapid cooling of a high temperature gas, comprising:
   a plurality of cylindrical housings connected to one another;
   a jacket on an outer side of any one of the plurality of cylindrical housings;
   an inner cylinder disposed at least in an interior of a first cylindrical housing of the plurality of cylindrical housings;
   a heat insulation gasket configured to seal the first cylindrical housing and a top of the inner cylinder in the interior of the first cylindrical housing;
   inner members distributed along a wall of any one of the plurality of cylindrical housings, wherein the inner members are configured to communicate an interior of the jacket with an interior of any one of the plurality of cylindrical housings, and configured to distribute a liquid in the interior of the jacket to the interior of any one of the plurality of cylindrical housings;
   a high temperature gas inlet disposed on the heat insulation gasket;
   a gas and liquid phase outlet disposed on a bottom of a last cylindrical housing of the plurality of cylindrical housings; and
   a coolant inlet and outlet connected to the interior of the jacket.

2. The apparatus according to claim 1, wherein each of the inner members is an opening penetrating through the wall of any one of the plurality of cylindrical housings from the interior of the jacket, or the opening and a nozzle connected to the opening.

3. The apparatus according to claim 1, wherein the plurality of cylindrical housings comprise one of the following:
   one cylindrical housing with the inner cylinder and one cylindrical housing without the inner cylinder;
   one cylindrical housing with the inner cylinder and at least two cylindrical housings without the inner cylinder; or
   a plurality of combinations, wherein each of the plurality of combinations comprises one cylindrical housing with the inner cylinder and one cylindrical housing without the inner cylinder.

4. The apparatus according to claim 1, wherein any one of the plurality of cylindrical housings has a diameter of 10 mm to 5000 mm any one of the plurality of cylindrical housings has a height of 0.4 m to 2.5 m; and the inner cylinder and the jacket each have a same height as a corresponding cylindrical housing;
   a distance between any one of the plurality of cylindrical housings and the jacket is 5 mm to 100 mm;
   a distance between any one of the plurality of cylindrical housings and the inner cylinder is 1 mm to 100 mm;
   any one of the plurality of cylindrical housings has a thickness of 1 mm to 100 mm; the jacket on the outer side of any one of the plurality of cylindrical housings has a thickness of 1 mm to 100 mm; and the inner cylinder of any one of the plurality of cylindrical housings has a thickness of 1 mm to 50 mm; and
   any one of the plurality of cylindrical housings and the jacket are made of a lining material having a thickness of 0.05 mm to 10 mm.

5. The apparatus according to claim 1, wherein a gas entering any one of the plurality of cylindrical housings has an initial velocity of 1 m/s to 100 m/s;
   the gas has a staying time of 0.01 s to 5 s; and
   the gas has a flow rate of 10 Nm$^3$/h to 1000000 Nm$^3$/h, and a ratio of volume flow rates of a coolant to the gas is 1:10 to 5000.

6. The apparatus according to claim 2, wherein each of the inner members is a round or elongated opening that is not connected to a nozzle or that is connected to a nozzle.

7. The apparatus according to claim 6, wherein at least one of the following configurations is satisfied:
   a single nozzle has a flow rate of 10 L/min to 1000 L/min; the nozzle has a spray particle size less than or equal to 2000 μm; a pressure drop is controlled within a range less than or equal to 5 bar; and the single nozzle is capable of spraying at an angle of 60° to 120°;
   nozzles are uniformly distributed on any one of the plurality of cylindrical housings or mounted in a center of the interior of any one of the plurality of cylindrical housings, and the nozzle is mounted on any one of the plurality of cylindrical housings in a direction which is at 30° to 150° with a direction of a horizontal tangent of a mounting point on the wall of the cylindrical housing, and at 30° to 150° with an axial direction of the wall of the cylindrical housing; or
   a number of nozzles on each cross-section of any one of the plurality of cylindrical housings is 1 to 50, the nozzles are disposed in a single layer or multiple layers, a number of layers is determined according to a height of the apparatus for rapid cooling, and a distance between adjacent layers of nozzles is required to be 10 mm to 1000 mm.

8. The apparatus according to claim 6, wherein the round or elongated opening has an open area ratio greater than or equal to 0.05% and an equivalent diameter greater than or equal to 0.5 mm; round or elongated openings are uniformly distributed or concentrated disposed; a coolant ejected from the round or elongated opening has a linear velocity of 0.5 m/s to 50 m/s, and a pressure drop is less than or equal to 5.0 bar.

9. The apparatus according to claim 1, wherein a material for manufacturing any one of the plurality of cylindrical housings, the inner cylinder, the jacket and the nozzle of the apparatus has a thermal conductivity greater than or equal to 5W/m*K, and the material is selected from CS, 316L, a nickel-based material and a tantalum material.

10. A system for rapid cooling of a high temperature gas, comprising an apparatus for rapid cooling of a high temperature gas, and further comprising a gas-and-liquid separation device, a liquid delivery device, and a heat transfer device;
    wherein the apparatus for rapid cooling of a high temperature gas comprises:
        a plurality of cylindrical housings connected to one another;
        a jacket on an outer side of any one of the plurality of cylindrical housings;
        an inner cylinder disposed at least in an interior of a first cylindrical housing of the plurality of cylindrical housings;
        a heat insulation gasket configured to seal the first cylindrical housing and a top of the inner cylinder in the interior of the first cylindrical housing;
        inner members distributed along a wall of any one of the plurality of cylindrical housings, wherein the inner members are configured to communicate an interior of the jacket with an interior of any one of the plurality of cylindrical housings, and configured to distribute a liquid in the interior of the jacket to the interior of any one of the plurality of cylindrical housings;
        a high temperature gas inlet disposed on the heat insulation gasket;
        a gas and liquid phase outlet disposed on a bottom of the cylindrical housing of a bottom of a last cylindrical housing of the plurality of cylindrical housings; and
        a coolant inlet and outlet connected to the interior of the jacket, and
    wherein an outlet of the apparatus for rapid cooling of the high temperature gas is connected to an inlet of the gas-and-liquid separation device through a pipe, the gas-and-liquid separation device has a gas outlet and a liquid outlet, and a liquid of the gas-and-liquid separation device is delivered to the heat transfer device through the liquid delivery device and returned to an inlet of a jacket of the apparatus for rapid cooling of the high temperature gas after being delivered out of the heat transfer device.

11. A method for rapid cooling of a high temperature gas using an apparatus for rapid cooling of a high temperature gas, wherein the apparatus for rapid cooling of a high temperature gas comprises:
    a plurality of cylindrical housings connected to one another;
    a jacket on an outer side of any one of the plurality of cylindrical housings;
    an inner cylinder disposed at least in an interior of a first cylindrical housing of the plurality of cylindrical housings;
    a heat insulation gasket configured to seal the first cylindrical housing and a top of the inner cylinder in the interior of the first cylindrical housing;
    inner members distributed along a wall of any one of the plurality of cylindrical housings, wherein the inner members are configured to communicate an interior of the jacket with an interior of any one of the plurality of cylindrical housings, and configured to distribute a liquid in the interior of the jacket to the interior of any one of the plurality of cylindrical housings;
    a high temperature gas inlet disposed on the heat insulation gasket;
    a gas and liquid phase outlet disposed on a bottom of a last cylindrical housing of the plurality of cylindrical housings; and
    a coolant inlet and outlet connected to the interior of the jacket, and the method comprising:
    a strongly corrosive solid-containing high temperature gas entering the apparatus for rapid cooling of the high temperature gas and being cooled in an interior of the first cylindrical housing by a liquid entering the apparatus;
    the gas being further mixed with the liquid entering the apparatus and cooled in an interior of a cylindrical housing at a next stage; and a gas phase and a liquid phase entering a gas-and-liquid separation device, the gas phase being cooled leaving the gas-and-liquid separation device, part of the liquid phase being extracted, and part of the liquid phase being cooled and then returning to the apparatus for rapid cooling of the high temperature gas.

12. The apparatus according to claim 3, wherein each of the inner members is a round or elongated opening that is not connected to a nozzle or that is connected to a nozzle.

13. The apparatus according to claim 4, wherein each of the inner members is a round or elongated opening that is not connected to a nozzle or that is connected to a nozzle.

14. The apparatus according to claim 5, wherein each of the inner members is a round or elongated opening that is not connected to a nozzle or that is connected to a nozzle.

15. The system according to claim 10, wherein each of the inner members is an opening penetrating through the wall of any one of the plurality of cylindrical housings from the interior of the jacket, or the opening and a nozzle connected to the opening.

16. The system according to claim 10, wherein the plurality of cylindrical housings comprise one of the following:
    one cylindrical housing with the inner cylinder and one cylindrical housing without the inner cylinder;
    one cylindrical housing with the inner cylinder and at least two cylindrical housings without the inner cylinder; or
    a plurality of combinations, wherein each of the plurality of combinations comprises one cylindrical housing with the inner cylinder and one cylindrical housing without the inner cylinder.

17. The system according to claim 10, wherein any one of the plurality of cylindrical housings has a diameter of 10 mm to 5000 mm; any one of the plurality of cylindrical housings has a height of 0.4 m to 2.5 m; and the inner cylinder and the jacket each have a same height as a corresponding cylindrical housing;
    a distance between any one of the plurality of cylindrical housings and the jacket is 5 mm to 100 mm;
    a distance between any one of the plurality of cylindrical housings and the inner cylinder is 1 mm to 100 mm;
    any one of the plurality of cylindrical housings has a thickness of 1 mm to 100 mm; the jacket on the outer side of any one of the plurality of cylindrical housings has a thickness of 1 mm to 100 mm; and the inner cylinder of any one of the plurality of cylindrical housings has a thickness of 1 mm to 50 mm; and
    any one of the plurality of cylindrical housings and the jacket are made of a lining material having a thickness of 0.05 mm to 10 mm.

18. The method according to claim 11, wherein each of the inner members is an opening penetrating through the wall of any one of the plurality of cylindrical housings from the interior of the jacket, or the opening and a nozzle connected to the opening.

19. The method according to claim 11, wherein the plurality of cylindrical housings comprise one of the following:

one cylindrical housing with the inner cylinder and one cylindrical housing without the inner cylinder;

one cylindrical housing with the inner cylinder and at least two cylindrical housings without the inner cylinder; or a plurality of combinations, wherein each of the plurality of combinations comprises one cylindrical housing with the inner cylinder and one cylindrical housing without the inner cylinder.

20. The method according to claim 11, wherein any one of the plurality of cylindrical housings has a diameter of 10 mm to 5000 mm; any one of the plurality of cylindrical housings has a height of 0.4 m to 2.5 m; and the inner cylinder and the jacket each have a same height as a corresponding cylindrical housing;

a distance between any one of the plurality of cylindrical housings and the jacket is 5 mm to 100 mm;

a distance between any one of the plurality of cylindrical housings and the inner cylinder is 1 mm to 100 mm;

any one of the plurality of cylindrical housings has a thickness of 1 mm to 100 mm; the jacket on the outer side of any one of the plurality of cylindrical housings has a thickness of 1 mm to 100 mm; and the inner cylinder of any one of the plurality of cylindrical housings has a thickness of 1 mm to 50 mm; and any one of the plurality of cylindrical housings and the jacket are made of a lining material having a thickness of 0.05 mm to 10 mm.

* * * * *